United States Patent [19]

Dodson-Edgars

[11] Patent Number: 4,820,980

[45] Date of Patent: Apr. 11, 1989

[54] GAP, WEAR AND TRAM MEASUREMENT SYSTEM AND METHOD FOR GRINDING MACHINES

[76] Inventor: Darryl Dodson-Edgars, 10765 SW. Muirwood Dr., Portland, Oreg. 97225

[21] Appl. No.: 45,450

[22] Filed: May 4, 1987

[51] Int. Cl.[4] .......................... G01B 7/14; G01B 7/10; B02C 7/14; G01N 27/72

[52] U.S. Cl. .................................... 324/207; 241/37; 324/226; 324/227; 324/229

[58] Field of Search ...................... 324/71.1, 173, 174, 324/207, 208, 226, 227, 229–232; 241/37; 73/597, 660, 661, 7

[56] References Cited

U.S. PATENT DOCUMENTS

| | | | |
|---|---|---|---|
| 2,548,599 | 4/1951 | Garr | 241/37 |
| 2,921,298 | 1/1960 | Jackson | 340/199 |
| 2,978,599 | 4/1961 | Wilcox | 324/174 X |
| 3,434,670 | 3/1969 | May | 241/37 |
| 3,488,581 | 1/1970 | Foster | 324/207 |
| 3,500,179 | 3/1970 | May | 324/208 |
| 3,539,912 | 11/1970 | Wardle | 324/207 |
| 3,848,814 | 11/1974 | Syrjanen | 241/37 |
| 3,932,941 | 1/1976 | Ormsby | 73/7 |
| 4,073,442 | 2/1978 | Virving | 241/37 |
| 4,387,339 | 6/1983 | Akerblom | 324/207 |
| 4,418,574 | 12/1983 | Flournoy | 324/229 X |
| 4,669,310 | 6/1987 | Lester | 73/597 |
| 4,673,875 | 6/1987 | Kjellqvist et al. | 324/207 |

FOREIGN PATENT DOCUMENTS 841600  5/1970  Canada .................................. 241/37

OTHER PUBLICATIONS

Application Note No. 112, "Groove Tracking", Kaman Sciences Corp., 1979.
"Optimizing Refiner Plate Bar Height Will Reduce Energy Consumption", by Joseph Antku Jr. and Carol J. Ludwig, *Pulp & Paper*, Mar. 1986, pp. 95–97.

*Primary Examiner*—Gerard R. Strecker
*Attorney, Agent, or Firm*—Price, Gess & Ubell

[57] ABSTRACT

An apparatus and method for measuring the gap, tram, deflection, and wear of rotating grinding plates wherein inductive sensors are mounted in a recessed manner inset from the surface of a first grinding plate and located opposite recessed non-wear surfaces of a second grinding plate, thereby providing data by which plate gap and plate wear may be derived. A plurality of such sensors provide data by which plate tram and/or deflection may be deduced.

19 Claims, 8 Drawing Sheets

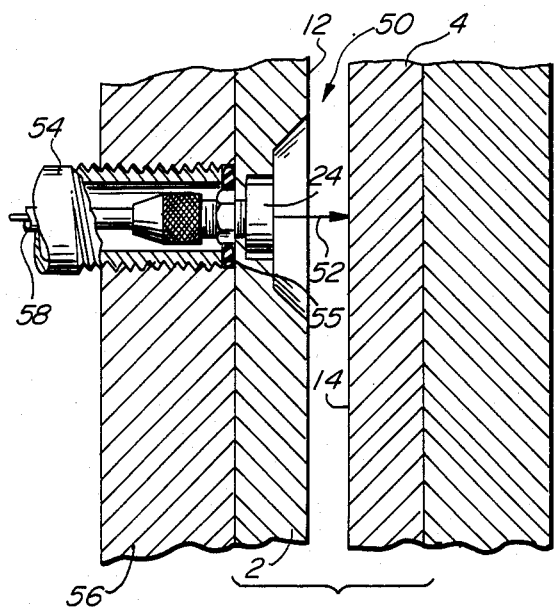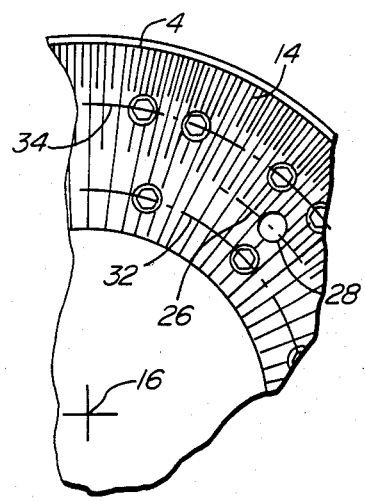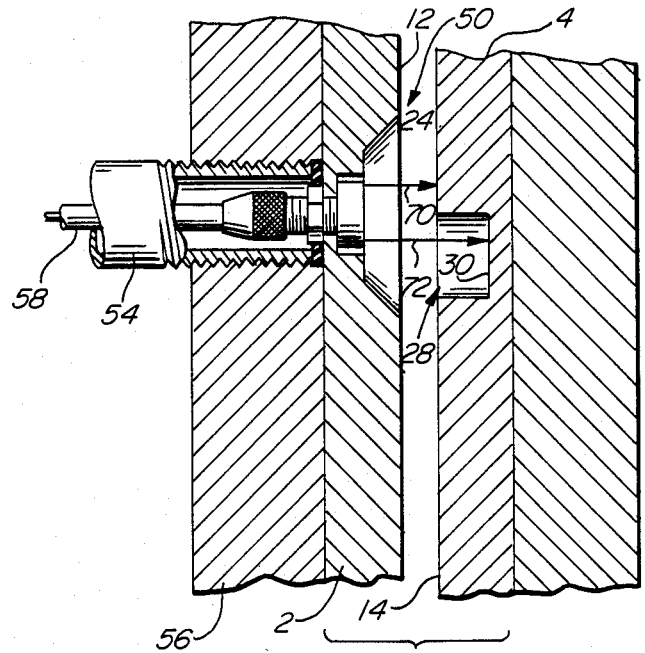

GAP, WEAR AND TRAM MEASUREMENT SYSTEM AND METHOD FOR GRINDING MACHINES

BACKGROUND OF THE INVENTION

The present invention relates to grinding machines and particularly to wood pulp grinding machines.

Grinding machines, also called "refiners", are used in the paper industry to convert wood chips into pulp wherein the wood chips are introduced between co-axially mounted rotating grinding plates having a narrow gap therebetween. Grooves in the grinding plates tear the wood fibers apart while processed wood pulp extrudes from the outer periphery of the grinding cavity between the plates. The size and shape of the cavity between the plates directly affects the quality and consistency of the wood pulp product.

Because the grinding plates are closely situated, the distance therebetween being measured in thousandths of an inch, plate gap must be carefully controlled to insure uniform pulp quality and prevent plate contact. During operation of the refiner, operating temperatures, the rate of introduction of wood chips into the grinding cavity, and plate mass distribution can affect plate gap. If plate gap is allowed to become too large, wood pulp of a coarser texture can contaminate an otherwise finely textured batch. If plate gap becomes too small, the plates may clash in undesirable metal to metal contact. Thus, a constant plate gap should be maintained throughout refiner operation. Similar considerations hold for plate tram or plate parallelism; the plates should remain parallel during refiner operation.

Due to great pressure exerted upon the plates during refiner operation, it is possible for the outer periphery of a grinding plate to actually bend or move away from the plate cavity while the interior portions of the plate remain substantially in place. This condition, termed deflection, may be determined by detecting a greater gap around the periphery than that is found nearer the interior of the cavity. Dynamic measurement of plate deflection is an important system capability.

Plate wear should also be monitored so as to allow optimal replacement of grinding plates. Without a means for measuring wear during operation of the refiner, the refiner has to be shut-down just to check wear. Dynamic measurement of plate wear, i.e., during refiner operation, would have the advantage of requiring at most one shut-down to replace worn plates; in cases where plate replacement can be coordinated with other refiner shutdowns, efficiency is thereby enhanced.

In sum, four measurements are important to the operation of wood chip refiners: gap, tram, deflection and wear. It is desirable to monitor and control these parameters during refiner operation to provide uniform pulp quality, prevent metal to metal contact, and to allow optimum replacement of worn plates. Various measurement devices have heretofore been developed for measuring gap, tram, or wear, and in some cases a single device measures both gap and tram. However, no single apparatus is known, preceding the present invention, which provides means for dynamic measurement of gap, tram, deflection and wear.

May Pat. Nos. 3,500,179 and 3,434,670 disclose the use of a magnet located at the periphery of one grinding plate and a series of coils located at the periphery of the other grinding plate, opposite the magnet. During relative rotation of the two plates, the magnitude of signals developed in the coils caused by the magnetic field of the passing magnet, are representative of the local distance between the grinding plates. This method is limited to distance measurements at the periphery of the grinding plates and does not include measurement of plate wear.

Garr Pat. No. 2,548,599 teaches the use of a first inductive sensor embedded in a grinding plate and directed toward the grinding surface of the opposing grinding plate; the output from the first inductive sensor is representative of the distance to the opposite grinding surface. The sensor is mounted flush with the grinding surface and unfortunately wears as the surface of the grinding plate wears. A second sensor is used to generate a control signal wherein the second sensor is stationary and directed toward a stationary metallic surface. The control distance from the second sensor to the stationary metallic surface can be accurately measured and controlled by means of independent measurement using micrometers. The outputs of the first and second sensors are compared, while the control distance from the second sensor to the stationary metallic surface is manipulated. At a time when the sensor outputs are equal, the control distance from the second sensor to the stationary metallic surface is equal to the gap between the grinding plates. Although this method provides distance measurements within the periphery of the grinding plates, the sensor becomes worn during operation and as a result must be replaced. Furthermore, no means for measuring plate wear is disclosed.

An inductive sensor device is disclosed in Akerblom Pat. No. 4,387,339. A core element of a material highly permeable to magnetic action is located within one grinding plate. Disposed about the core are two windings, one of which is closer to the grinding surface of the other grinding plate. Each of said windings is supplied with current so as to energize the windings in opposite directions and this current is controlled for maintaining a resultant magnetic flux through a DC field meter positioned between the windings equal to zero. The difference between the currents supplied to the windings is representative of the distance between the grinding plates. This method is limited to the measurement of the gap and tram between the grinding plates.

In the past, sensors have necessarily been mounted flush with the grinding surface of the plate in which they are mounted, and, as a result, such sensors experience wear during refiner operation. Gap readings taken from a recessed sensor would be inaccurate unless plate wear were considered, a parameter heretofore not dynamically measurable. What is needed is an apparatus for measuring plate wear and which would then allow recessed sensors to accurately measure the gap between plates.

SUMMARY OF THE INVENTION

In accordance with the present invention, an inductive sensor is inset from the surface of one refiner grinding plate and located opposite a recessed non-wear surface in the other refiner grinding plate. The inductive sensor directly measures both gap and wear during refiner operation. Specifically, the inductive sensor measures the relative positions of the worn grinding surface and the non-wearing recessed surface to provide wear data. The distance from the sensor to the opposite grinding surface in conjunction with said wear data provides plate gap data. Plate parallelism or tram and plate deflection are measured by a plurality of such sensors positioned at different locations to determine plate gap throughout the grinding cavity.

It is therefore an object of the present invention to provide an improved means for direct measurement of grinding plate gap, wear, deflection and tram during operation of a refiner, thereby allowing improved refiner control, consistent wood pulp quality, and optimal grinding plate replacement.

It is a further object of the present invention to provide an improved measurement system in which the sensor is not worn during refiner operation.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 3 illustrates sensor mounting details;

FIG. 4 depicts primary sensor measurement parameters;

Figure 5:
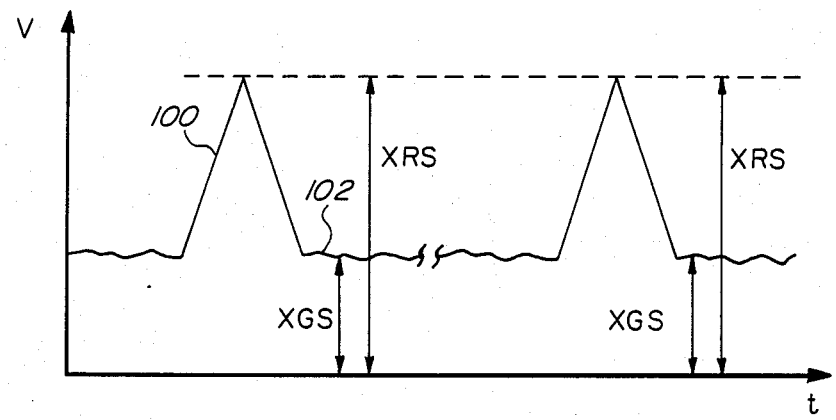
Figure 7:
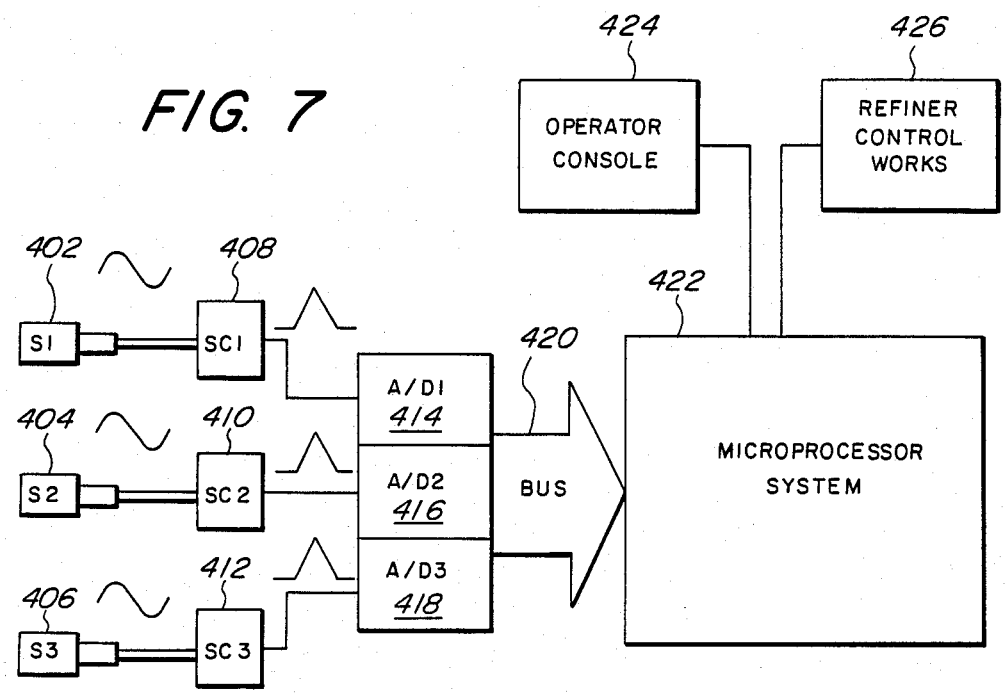
Figure 6A:
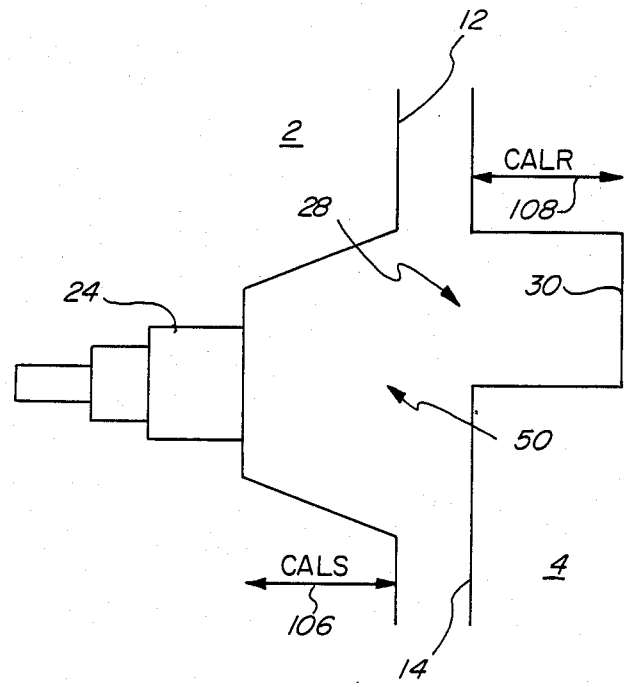
Figure 6B:
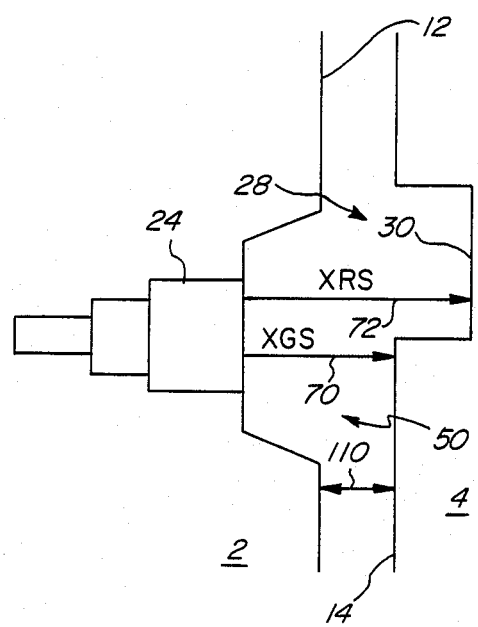
Figure 8:
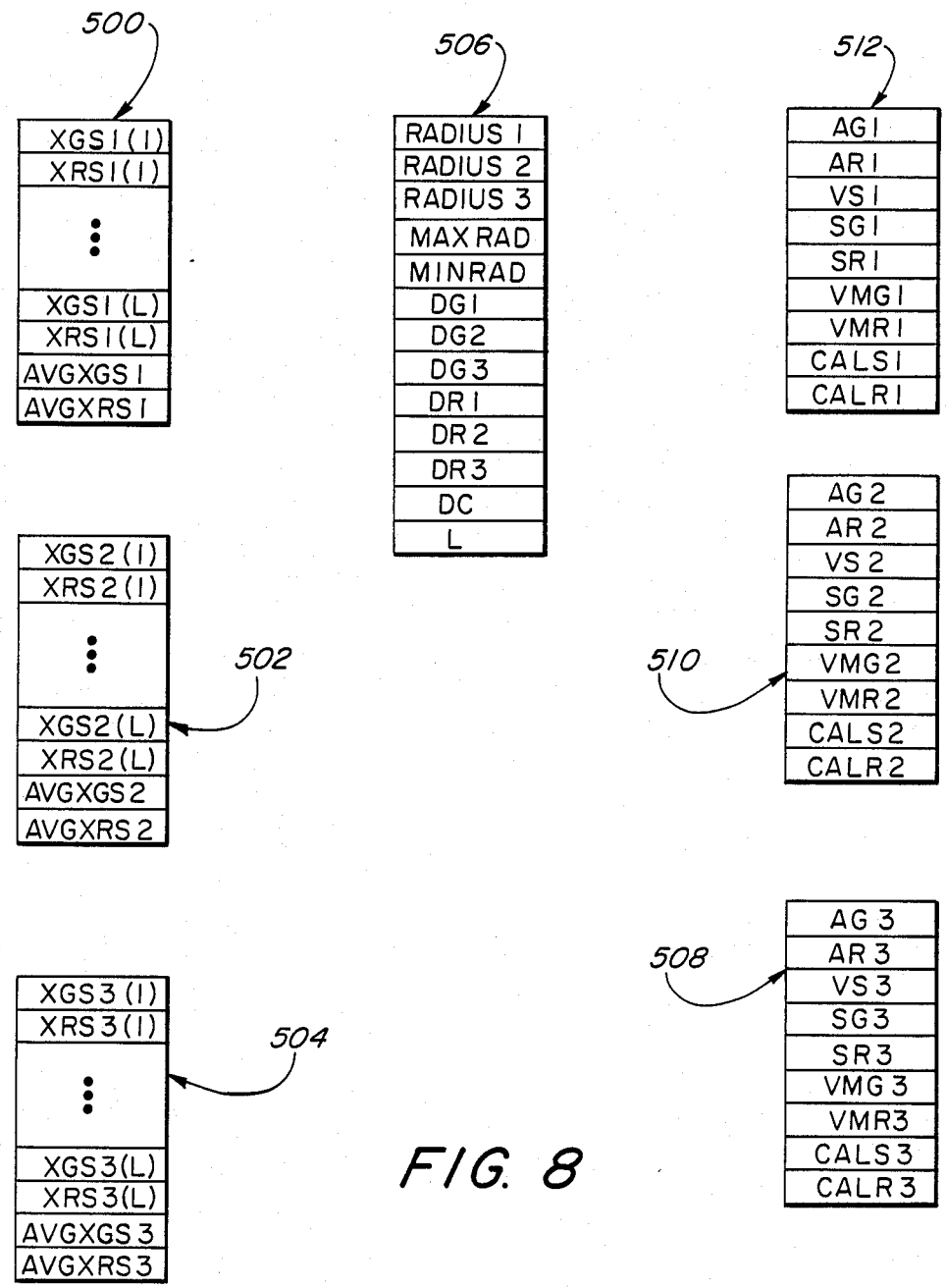
Figure 9:
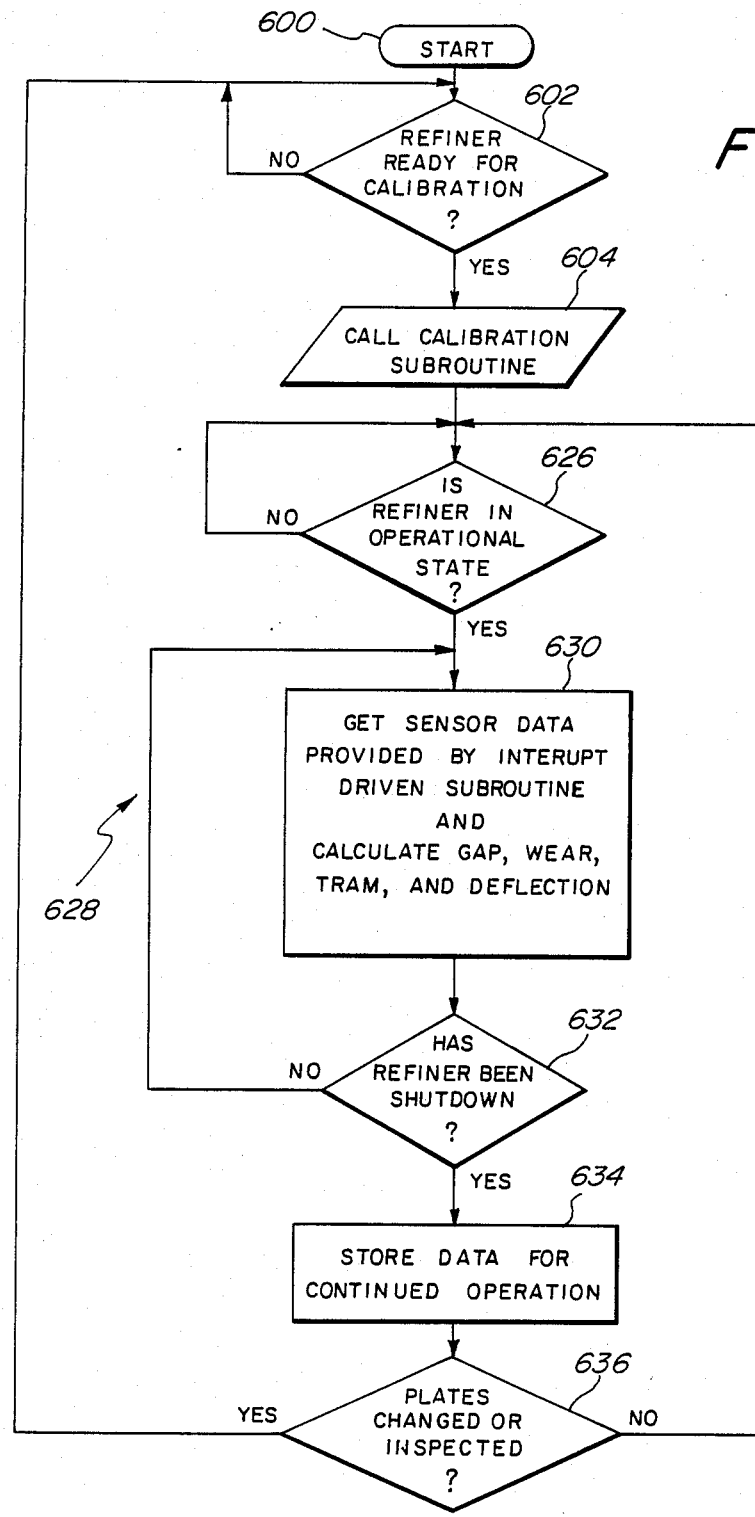
Figure 10:
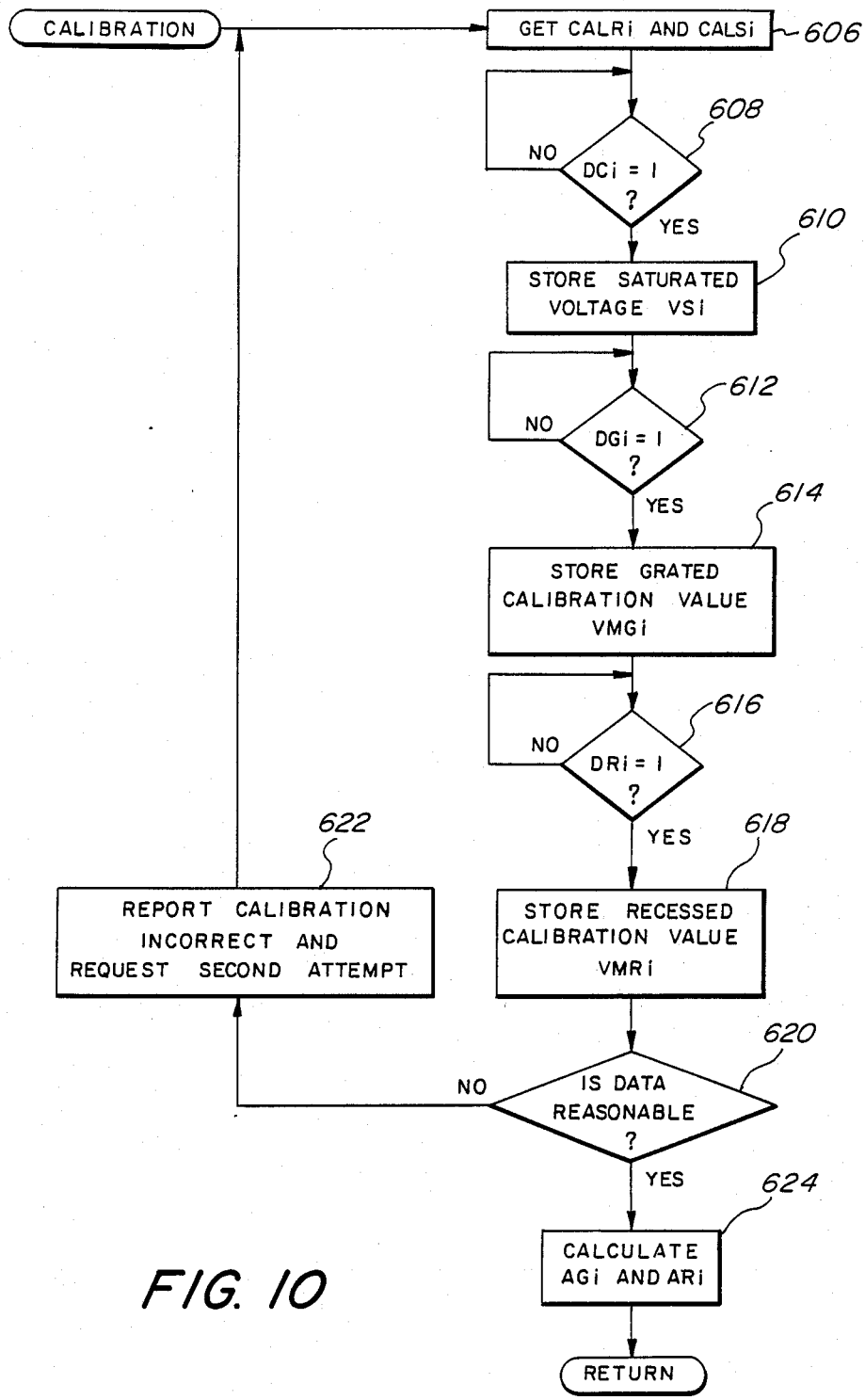
Figure 11:
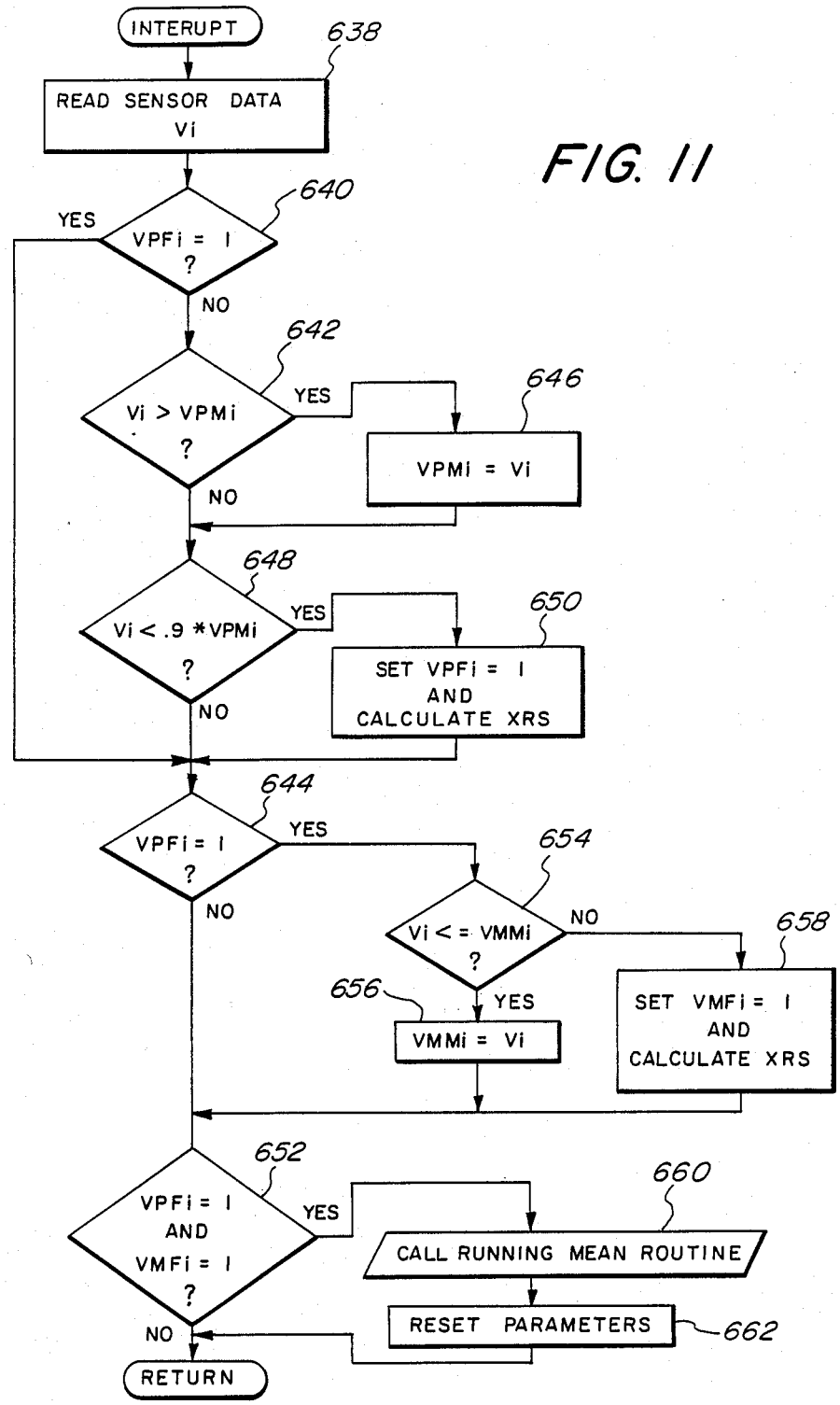

FIG. 5 graphs sensor output voltage as a function of time during refiner operation;

FIGS. 6A and 6B compare grinding plates before and after wear;

FIG. 7 is a block diagram of a microprocessor control system making use of the present invention;

FIG. 8 is a memory allocation diagram for the microprocessor system of FIG. 7;

FIG. 9 is a flow chart of overall program operation for the microprocessor system of FIG. 7;

FIG. 10 is a flow chart for a calibration routine utilized in the system of FIG. 7; and FIG. 11 is a flow chart for an interrupt driven data acquisition routine also utilized in the system of FIG. 7.

DETAILED DESCRIPTION

Figure 1:
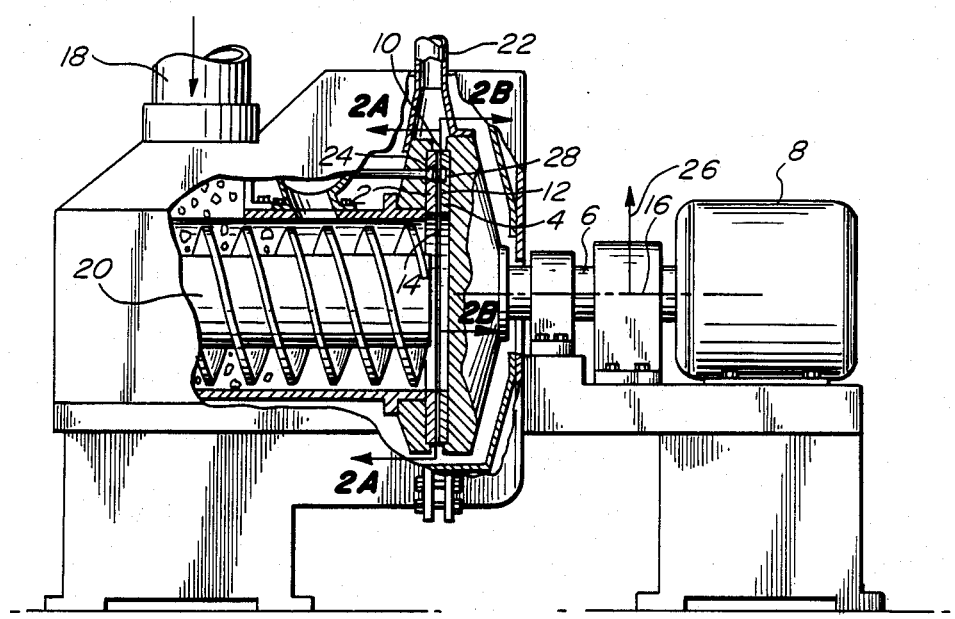
FIG. 1 illustrates a typical single rotating grinding plate arrangement.

Referring to FIG. 1, a stationary grinding plate 2 opposes a revolving grinding plate 4, the revolving plate 4 being coupled by drive shaft 6 to a drive means 8. Wood chips enter feed chute 18 and are forced into a grinding cavity 10 centrally between the plates by means of a rotating feed screw 20. Processed wood pulp exits the periphery of grinding cavity 10 and is removed from the refiner via exit chute 22. Plate gap, the width of grinding cavity 10, is controlled by linear displacement of either revolving plate 4 or stationary plate 2, thereby affecting the separation between stationary grinding surface 12 (the surface of plate 2) and revolving grinding surface 14 (the surface of plate 4). Plate tram may be controlled by angular displacement of drive shaft 6 or by angular displacement of stationary plate 2 to conform to the positioning of rotating plate 4. Grinding plates 2 and 4 are generally disposed co-axially along a common axis 16 which is colinear with drive shaft 6.

Figure 2:
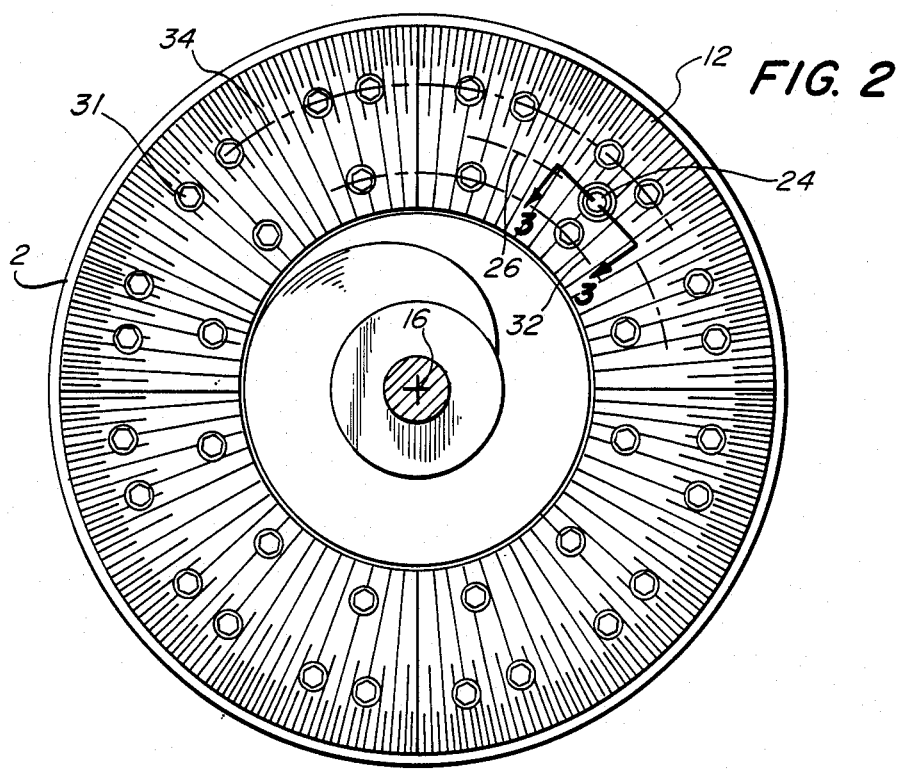
FIG. 2A is a face view of a stationary grinding plate having a sensor mounted thereon.
FIG. 2B shows a portion of a rotating grinding plate having a recessed non-wear surface.

A sensor 24 is placed in stationary plate 2 at a radius 26 (see FIG. 2) and a recessed area 28 or blind hole is drilled in revolving plate 4 at the same radius 26. As the plates rotate, sensor 24 "sees" recessed area 28 once every revolution and otherwise "sees" grinding surface 14. This allows sensor 24 to measure both the distance to the opposing grinding surface 14 and the distance to, or, by calculation, the depth of, a recessed surface 30 (see FIGS. 4, 6A, and 6B) within recessed area 28. Note that sensor 24 is also recessed from grinding surface 12 to prevent wear during operation.

A plurality of sensors provide data for calculation of important system parameters. Additional sensors may be placed at radius 26 upon stationary plate 2 to provide gap information at other locations opposite the path of recessed area 28. Additional recessed areas similar to area 28 may be placed at other radii opposite further sensors. Comparison of data from sensors at different radii can provide plate deflection data, plate deflection being indicated by a greater plate gap at an outer radius than at an inner radius. Comparison of data from symmetrically distributed sensors provides a measure of plate tram by subtracting the smallest gap calculation from the largest gap calculation, an out of tram condition being indicated by an excessive difference in gap calculation. Wear calculations should be substantially the same for all sensors.

Other refiner arrangements may include dual rotating plates coupled to a common drive means wherein said dual rotating plates are sandwiched between opposed stationary plates. The present invention is applicable to any refiner making use of opposing grinding plates set in relative rotation. However, only the single rotating plate arrangement of FIG. 1 will be discussed since application of the present invention to other refiner arrangements will then be apparent.

Referring now to FIGS. 2A and 2B, grinding surfaces 12 and 14 of plates 2 and 4, respectively, are substantially circular and planar, having grooved or grated patterns thereon. Rotating plate 4 is rotatable about center axis 16 while stationary plate 2 is centered upon axis 16. Grinding plates 2 and 4 are actually composed of a plurality of individual sections wherein recessed mounting bolts 31 secure individual plate sections and are located at an inner radius 32 and an outer radius 34 on plates 2 and 4. Sensor 24, located upon stationary plate 2 (FIG. 2A), and recessed area 28, located upon rotating plate 4 (FIG. 2B), are suitably positioned at radius 26 thereby allowing sensor 24 to "see" recessed area 28 and to avoid sensing recessed mounting bolts and the like upon rotating plate 4 at radii 32 and 34.

FIG. 3 is a sectional view taken along lines 3—3 of FIG. 2A showing sensor mounting details for sensor 24 mounted within stationary grinding plate 2 and directed toward grinding surface 14 of rotating grinding plate 4. Sensor 24 is inset from grinding surface 12 of stationary plate 2 within recessed area 50 and measures the distance 52 to the metallic surface of the opposing grinding plate. Note that recessed area 50 is broader than the width of sensor 24 thereby substantially removing the metal of plate 2 from the sensing field of sensor 24. A one inch stainless steel schedule 40 SS pipe 54 is secured within a rear mounting plate 56, plate 56 being located behind stationary plate 2, to provide a sensor housing. To seal the sensor housing, "0" rings 55 may be placed at the forward end of pipe 54. Sensor output is transmitted via co-axial cable 58 through the back of rear mounting plate 56. In the event that a sensor is mounted upon a rotating grinding plate, such as plate 4 (FIG. 1), it is desirable to couple sensor output through a rotary transformer or the like.

FIG. 4 is a sectional view similar to FIG. 3 except that rotating plate 4 has moved to a position exposing recessed area 28 to sensor 24. Primary sensor measurement parameters, XGS 70 and XRS 72, are illustrated in the context of opposing plate structures 2 and 4 being in relative motion. XGS 70 is the distance from sensor 24 to the opposing grinding surface 14 and XRS 72 is the distance from the sensor to the recessed surface 30 within recessed area 28. The distance from sensor 24 to the recessed surface 30, XRS 72, minus the distance from the sensor to the opposing grinding surface, XGS 70, provides a direct measure of plate wear data. As the plates wear, the distance from recessed surface 30 to grinding surface 14 of plate 4 diminishes; thus, plate wear is represented as a change in the difference between the primary measurement parameters XGS 70 and XRS 72. Note that subtracting XGS 70 from XRS 72 yields the same result irrespective of current plate gap, a change in the difference between the two measurements being a function of plate wear and not a function of plate gap.

Prior to the present invention, plate gap could not be accurately measured by a recessed sensor due the effect of plate wear. Knowledge of the amount of plate wear furthermore provides sufficient information for a recessed sensor to calculate plate gap. The present invention, capable of dynamic wear measurement, allows sensors to be recessed from the grinding surface thereby avoiding costly replacement of sensors.

FIG. 5 graphs sensor output voltage vertically and time horizontally during refiner operation wherein sensor output is representative of the distance from the sensor to the opposing metallic surface. In operation, the sensor constantly measures this distance and provides an instantaneous or current distance reading. (Actually the sensor itself provides a high frequency oscillating signal to a signal conditioning circuit which in turn provides a voltage level signal herein referred to as the sensor output.) A suitable sensor would include the type manufactured by Kamen Instrumentation under Model No. KD 2300-8C. Referring now to FIGS. 4–5, as recessed area 28 passes in front of sensor 24, a relatively greater distance is sensed, and an output is produced in the form of a triangular voltage pulse. The pulse is triangular because the interaction of sensor 24 and recessed area 28 increases as recessed area 28 moves in front of sensor 24 until they are on center, at which time the interaction decreases until recessed area 28 has passed beyond the range of sensor 24. Recessed surface 30 should be sufficiently wide that the greatest distance is accurately sensed. In FIG. 5, voltage pulse 100 is caused by the sensing of recessed surface 30 (FIG. 4) and following voltage pulse 100, sensor output returns to a base level 102 as grinding surface 14 (FIG. 4) passes in front of sensor 24. The magnitude of voltage pulse 100 is representative of XRS 70 (FIG. 4) and the magnitude of base level 102 is representative of XGS 72.

Though the voltage pulse provided by the sensor is representative of the distance measured, it is not actually a linear representation and is therefore translated into an actual linear displacement. Experimental observation of sensor output voltage as a function of distance from the sensor to a metallic surface has revealed the fact that the output voltage of an embedded probe of the type utilized by the present invention follows an inverted parabolic curve with great accuracy. The nature of this inverted parabolic curve provides a model by which sensor output voltage may be interpreted to obtain an actual linear displacement. The general equation for a parabola that is placed from the origin and inverted in a Cartesian coordinate system appears as $$V = G(Xs - X)^2 + Vs$$

where Xs is the distance when the output voltage saturates, X is the linear displacement, Vs is the value of the sensor voltage when increasing the displacement no longer increases the output and G is the parabolic gain term. This equation can be made to match the probe calibration by performing three simple measurements from which the inverted parabola may be fully characterized. The first measurements are the saturated values for Xs and Vs. These values are easily obtained by placing a target in front of the embedded probe and noting the displacement from the sensor to the target when sensor output saturates. Gain, G, is obtained by finding one point on the curve which then fixes the value of V and X. The equation above is then directly solved for the gain value G. The easiest method for, finding this point is to use a known displacement from the sensor. This could be the distance from the sensor to the grinding surface of the plate surrounding the probe. The value for the gain can be calculated from the following expression:

$$G = (Vm - Vs)/(Xm - Xs)^2$$

where Vm is the measured voltage at a known distance Xm and Vs is the saturation voltage which occurs at a known distance Xs. Now that the constants characterizing the inverted parabola are known, the equation can be solved for X as a function of sensor voltage V and the following equation results:

$$X = Xs - (V - Vs)^{\frac{1}{2}}/(G)$$

This is the general equation for use in translating sensor output voltage into linear displacement.

Maintenance personnel that install and maintain refiner plates can perform a simple calibration procedure in order to determine the afore-mentioned coefficients. These coefficients are then stored in a computer which monitors sensor voltage and derives by calculation an actual displacement from the sensor output voltage.

An important observation to note here concerns the fact that an opposing grinding surface has a response curve that is offset from the curve obtained from the recessed non-wear surface. This factor is utilized when the routine for interpreting the measurements translates sensor output voltage into an actual linear displacement. That is to say, two sets of characteristic coefficients are derived, one for the grinding surface and one for the recessed non-wear surface.

FIG. 6A and FIG. 6B compare grinding plates 2 and 4 before and after plate wear. FIG. 6A represents the refiner plates at a time when the plates are new and FIG. 6B represents the refiner plates after considerable wear. Turning to FIG. 6A, two calibration values are taken when the plates are new or are being re-calibrated. CALS 106 is the depth of recessed area 50, such depth being the distance from the top of sensor 24 to grinding surface 12. CALR 108 is the depth of recessed area 28, said depth being the distance from recessed surface 30 to grinding surface 14. CALS 106 and CALR 108 are preserved until the plates are replaced or recalibrated because wear measurements are calculated relative to these calibration values.

FIG. 6B represents the condition of the opposing grinding plates during refiner operation after wear, with primary measurement parameters XGS 70 and XRS 72 being the current readings from the sensor. The plates are now separated by a GAP 110.

Referring now to FIGS. 6A and 6B, wear for plate 4 may be calculated as:

$$WEAR = CALR - (XRS - XGS)$$

It can be safely assumed that both plates wear at the same rate. Thus, the following relationship may be observed:

$$(CALS + CALR) + GAP = XRS + 2*WEAR$$

from which plate gap may be derived as:

$$GAP = (2*XGS) - XRS + (CALR - CALS)$$

In a preferred embodiment, sensor output is monitored by a microprocessor system having means for controlling plate gap and plate tram under software control. FIG. 7 depicts a typical implementation of a refiner system utilizing inductive sensors which measure, generate, and display the output signals needed for process control, maintenance, and local monitoring at the refiner. The set of three sensors 402-406 cooperate with signal conditioning circuits 408-412 to provide analog signals representative of the respective distance measurements as inputs to high speed analog to digital (A/D) converters 414-418, there being one A/D convertor for each sensor. Digital versions of the distance measurements are supplied via a bus connection 420 to microprocessor system 422 having an operator console 424 to display system status information and for inputting additional control signals. Microprocessor 422 is interfaced to a refiner control works 426 capable of manipulating refiner controls.

FIG. 8 comprises a memory allocation diagram for the microprocessor system of FIG. 7, having three basic data structures: running mean arrays 500-504, system constants table 506, and linearization constants arrays 508-512. For each sensor producing high frequency voltage pulses, or distance data, a running mean array is maintained within the microprocessor. Each running mean array contains a history of the latest primary measurement parameters from which an average value is computed to eliminate unwanted signal jitter. For example, in reference to FIG. 8, a running mean array 500 is maintained for sensor one which begins with a pair XGS1(1) and XRS1(1) and continues through to a pair XGS1(L+1) and XRS1(L+1). The value L is the number of pairs to be averaged and may be adjusted as needed. As new data is acquired via an interrupt driven data acquisition routine, the oldest pairs in the running mean array are replaced with new data. Running mean array 500 concludes with an average XGS value stored in location AVGXGS1, computed using values taken from XGS(1) through XGS(L+1), and an average XRS value stored in AVGXRS1, computed using values taken from XRS(1) through XRS(L+1). Running mean arrays 502 and 504 for sensors two and three, respectively, have similar data structures.

A table of constants is maintained in constants table 506. Generally, the constants table contains the radius at which each sensor is located, the number of readings to be maintained in the running mean arrays, and various flags used during calibration. RADIUS1, RADIUS2, and RADIUS3 store the radial locations for sensors one, two, and three, respectively. MAXRAD and MINRAD store the maximum and minimum sensor radii which are used to calculate plate deflection. Flags DG1, DG2, and DG3, for sensors one, two, and, three respectively, indicate calibration for the grated surface is ready to begin. Similarly, flags DR1, DR2, DR3 indicate calibration for the recessed surface is ready to begin. A flag DC signals that the sensors are clear.

Linearization constants are maintained for each sensor and used to interpret sensor data to obtain actual distance values. The following linearization constants for sensor one are found in linearization array 508. AG1 is the grated surface model coefficient, a parabolic gain term, calculated from the entered and measured values during grated surface calibration. AR1 is the recessed surface model coefficient, a parabolic gain term, calculated from the entered and measured values taken during recessed surface calibration. VS1 is the saturated sensor voltage taken during calibration when the plates are drawn apart, while SG1 and SR1 are the saturated grated and recessed surface constants corresponding to the saturated grated and recessed surface lengths needed for the model. VMG1 is the sensor voltage measured during the grated surface calibration, and VMR1 is the sensor voltage measured during the recessed surface calibration. CALS1 and CALR1 are the entered distance measurements for the depth of sensor one recess and depth of the recessed surface opposite sensor one. Linearization arrays 510 and 512 are used to interpret data from sensors two and three with similar data structures repeated.

Overall program operation is found in FIG. 9. Upon start-up, at terminal 600, the program proceeds to decision block 602 and waits to be told that the system is ready to begin calibration with control looping at decision block 602. When the refiner is ready for calibration, iteration at decision block 602 ceases and the calibration routine is invoked in block 604.

The calibration subroutine, used to build the parabolic model, is flow charted in FIG. 10. In reference to FIG. 10, this routine is executed for new plates, or plates being recalibrated. In order to obtain the necessary characterizing coefficients for the parabola, several measurements and values are entered during calibration The user measures the depth of the recessed area opposite each sensor (CALR1, CALR2, and CALR3 of FIG. 8) as well as the depth of the recessed areas containing the sensors (CALS1, CALS2, and CALS3 of FIG. 8). These values are entered into the microprocessor system at input block 606. Continuing with decision block 608, the program loops until the DC flag indicates that the plates have been pulled apart, and processing then branches from block 608 to block 610 wherein the saturated sensor voltages (VS1, VS2, and VS3) are captured and recorded Program execution loops at block 612 until the DG flag is set; during this time the user causes the rotating plate to be brought into contact with the stationary plate exposing the grinding surface to the sensor. When this is done the user sets the DG flag with execution proceeding to block 614 wherein the grinding surface calibration voltages (VMG1, VMG2, VMG3) are taken and recorded. The procedure loops at decision block 616 until the DR flag is set.

The rotating plate is then manually rotated until the recessed surfaces are exposed to the sensors (surfaces still in contact), and the user then sets the DR flag. Processing advances to block 618 to record the calibration voltages for the recessed surfaces (VMR1, VMR2, and VMR3). Data values are then checked for reasonableness in decision block 620 and if the data does not conform to reasonable expectations then the user is so informed in block 622 and the calibration procedure is repeated. Data would be considered reasonable if, for example, VMG<VMR<VS. If the data is found to be reasonable in decision block 620 then processing continues with calculation block 624. In block 624, the parabolic model coefficients (AG1, AG2, AG3, AR1, AR2, and AR3 of FIG. 8) are calculated and stored for use in obtaining actual displacement values from the measured dynamic sensor voltage data.

Returning to FIG. 9, the program remains idle after the calibration routine at decision block 626 until the refiner is in an operational state. After the refiner is operational, the main program loop 628 is invoked as control passes from decision block 626 to block 630 where current sensor data is gathered and system parameters, including gap, tram and wear are calculated in the aforementioned manner. Following calculation of system parameters, decision block 632 checks the operational status of the refiner and while the refiner remains operational, execution of the main program loop 628 continues. When the refiner is shut down control branches out of the main program loop 628 from decision block 632 to block 634 where current data is stored for continued operation. At this point the plates may be replaced if necessary. Decision block 636 determines whether or not the plates have been replaced; if they have, then return is made to decision block 602 and remains idle until the refiner is ready for calibration of the new plates. If the plates have not been replaced, calibration is not necessary and control passes to decision block 626 and waits until the refiner is operational.

Current sensor data is maintained in the running mean arrays by an interrupt driven data acquisition routine flow charted in FIG. 11. The interrupt subroutine is responsible for capturing the primary measurement parameters for each sensor, i.e., the peak value of the voltage pulse associated with the passing of a recessed surface in front a sensor and the base level associated with the grinding surface following the recessed surface. It may be assumed that sensor outputs are sampled many times during a given voltage pulse. The interrupt subroutine may be time or event driven, and, upon each invocation, current sensor readings are taken from each sensor and tested for peak or base values. As sensor output rises on the positive going edge of the triangular pulse, each new reading is greater than the last reading and the new reading is accepted as a candidate for the voltage peak. Just after the voltage pulse peaks, the new reading will be less than the last reading, indicating that the last reading should be taken as the voltage peak. Then, as sensor output follows the negative going side of the triangular pulse, each new reading is less than the previous reading and the new reading is accepted as a candidate for the voltage base level. When the voltage pulse reaches the base level the new reading will not be less than the previous reading, indicating that the last reading should be taken as the voltage base level. When the peak and base values have both been captured, they are recorded in the running mean array as a primary measurement parameter pair.

The interrupt subroutine makes use of several flags and comparison variables. VPM1 and VMM1 are comparison variables used hold the most recent sensor readings for sensor one. VPM1 is a voltage peak measurement initialized to 0, and VMM1 is a voltage minimum measurement initialized to 100% of sensor output capability. Similar comparison variables are used for sensors two and three: VPM2, VMM2, VPM3, and VMM3. A flag VPF1 is initialized to false and then set to true when a peak value for sensor one is detected, and a flag VMF1 is initialized to false then set to true when a minimum value is detected for sensor one. Similar flags are utilized for sensors two and three: VPF2, VMF2, VPF3, and VMF3.

In the following discussion, the aforementioned variables will be discussed with the numeric sensor identifier replaced with a generic "i" referencing all sensors.

Referring to FIG. 11, upon invocation of the interrupt subroutine, processing begins in block 638 where current sensor readings are taken and stored in Vi. The voltage peak flag VPFi is tested in decision block 640 and if VPFi is false, processing continues with comparison block 642. If VPFi is true, indicating a voltage peak has already been found, control skips to decision block 644. Assuming VPFi is false, Vi is compared to VPMi in decision block 642 and if Vi is greater than VPMi, as is the case when the sensor output travels up the positive going edge of the triangular voltage pulse, then the value of Vi is taken as the new VPMi in block 646 with control passing to block 648. If Vi is not greater than VPMi, as is the case immediately following a voltage peak, the program proceeds directly to decision block 648. In decision block 648 Vi is compared to a percentage, e.g. 90 percent, of VPMi to insure that the difference between Vi and VPMi is not due to signal noise. This percentage may be fine tuned based on operational experience. If Vi is found to be less than the given percentage of VPMi, then a voltage peak has occurred and in block 650 VPFi is set to tue, XRS is computed, and processing continues with block 644. If Vi is not found to be less than the given percentage, then decision block 644 is entered wherein the peak flag VPFi is tested, and if VPFi is false, the program proceeds to decision block 652. If peak flag VPFi is true, indicating a voltage peak has been captured, Vi is compared to VMMi in decision block 654 to determine whether the base level following said voltage peak has been reached. If Vi is less than or equal to VMMi, meaning that the base level has not been reached, VMMi takes the value of Vi in block 656 and processing continues with block 652. If Vi is not less than or equal to VMMi, indicating that the base level has been reached, then in block 658 the base level flag VMFi is set to true and XGS is computed after which processing continues in block 652. In block 652, both flags VPFi and VMFi are tested. If both VPFi and VMFi are not true then the interrupt routine terminates. If both flags are true, indicating successful capture of a primary measurement pair, then the pair is placed in the running mean array by a call in block 660 to the running mean routine. The running mean routine maintains the most recent sensor readings in the running mean arrays and calculates an average XGS and XRS. Following block 660 the comparison variables and flags are reset in block 662 in preparation for the next primary measurement pair after which the interrupt routine terminates.

In the preferred embodiment, blind holes are used to provide a non-wearing recessed surface; an alternative embodiment would make use of recessed mounting bolts or the like as non-wear recessed surfaces. A sensor mounted at the same radius as the recessed mounting bolts would then see many recessed surfaces in one plate revolution. However, the composition of the bolt differs from that of the plate material and the model for the recessed surface would have to be modified accordingly.

An improved refiner measurement system has been disclosed which may be used in the manufacture of wood pulp in the paper industry. Many modifications and variations are possible in light of the above teachings; the appended claims are intended to cover and embrace any such modifications which fall within the true spirit and scope of the invention.

I claim:

1. In a refiner having a first and second grinding plate, opposed to each other, said second grinding plate having a recessed, non-wear surface area facing said first grinding plate, a dynamic measurement method for determining distances utilizable in calculating plate wear, said measurement method comprising the steps:

measuring during refiner operation a first distance from said first grinding plate to a grinding surface of said second grinding plate; and measuring during refiner operation a second distance from said first grinding plate to said recessed non-wearing surface area of said second grinding plate.

2. A measurement method according to claim 1, further comprising the step of taking the difference between said first distance and said second distance.

3. A measurement method according to claim 1, further comprising the steps of taking the difference between said first distance and said second distance; and utilizing said difference in a calculation of plate gap.

4. In a refiner, a measurement system comprising:

first and second opposed grinding plates mounted for relative rotation with respect to a given axis;

said first grinding plate have a recessed area located at a known radius, said recessed area providing a recessed surface facing said second grinding plate; and a distance sensor positioned in said second grinding plate and directed toward said first grinding plate at said known radius such that said distance sensor senses the distance to the surface of said first grinding plate and the distance to said recessed surface;

whereby the change in the resultants of a number of subtractions wherein the distance to the surface of said first grinding plate is subtracted from the distance to said recessed area for a number of repetitions represents the wear of the grinding plates.

5. A measurement system as in claim 4, wherein said refiner is a wood pulp refiner.

6. A measurement system as in claim 4, wherein said recessed area is a mounting bolt inset area and said recessed surface comprises an upper surface of a mounting bolt.

7. A measurement system as in claim 4, wherein said recessed area is a blind hole and said recessed surface comprises the bottom of said blind hole.

8. A measurement system as in claim 4, wherein said known radius is less than the outer periphery of said first grinding plate and less than the outer periphery of said second grinding plate.

9. A measurement system as in claim 4, wherein said sensor is recessed from the grinding surface of said second grinding plate such that said sensor is not worn during operation of said refiner.

10. A measurement system as in claim 4, wherein said recessed surface is offset from and substantially parallel to the grinding surface of said first grinding plate.

11. A measurement system as in claim 4, wherein said first grinding plate is a rotating plate and said second grinding plate is a stationary plate.

12. In a refiner, a dynamic measurement system comprising:

a first grinding plate having a grinding surface;

a second opposed grinding plate having a grinding surface juxtaposed with respect to the grinding surface of said first grinding plate and a recessed non-wearing surface area; facing said first grinding plate; and distance measuring means in said first grinding plate for measuring during refiner operation, a first distance from said distance measuring means to the grinding surface of said second grinding measuring means to the non-wearing surface area of said second grinding plate;

whereby the change in the resultants of a number of subtractions wherein the first measured distance is subtracted from the second measured distance for a number of repetitions represents the wear of the grinding surfaces on the first and second grinding plates.

13. A dynamic measurement system as in claim 12, wherein said distance measurement means comprises a sensor means recessed from the grinding surface of said first grinding plate.

14. A dynamic measurement system as in claim 12, wherein said non-wearing surface area comprises a recessed area of a certain diameter in said second grinding plate and said distance measurement means comprises a sensor means having said certain diameter and recessed from the grinding surface of said first grinding plate.

15. A dynamic measurement system as in claim 14, further comprising means for calculating grinding plate wear by taking an initial difference value as the result of subtracting the initial first distance from the initial second distance; taking a current difference value as the result of subtracting the current first distance from the current second distance; and subtracting the current difference value from the initial difference value.

16. A dynamic measurement system as in claim 14, further comprising means for calculating plate wear and plate gap by utilizing a first calibration value s the distance from the sensor means to the grinding surface of the first grinding plate; a second calibration value as the distance from said non-wearing surface area of said second grinding plate to the grinding surface of said second grinding plate; taking an initial difference value as the result of subtracting the initial distance from the initial second distance; taking a current difference value as the result of subtracting the current first distance from the current second distance; calculating a plate wear value by subtracting the current difference value from the initial difference value; and calculating a plate gap value by taking twice the first distance, minus the second distance, plus the second calibration value, minus the first calibration value.

17. In a refiner having a first and second grinding plate, each having a grinding surface opposed to the other, a sensor means countersunk below the grinding surface of the first grinding plate, and a non-wear surface area countersunk below the grinding surface of the second grinding plate, a dynamic measurement method for determining distances utilizable in calculating plate wear, said measurement method comprising the steps:

measuring during refiner operation a first distance from the sensor means in said first grinding plate to the grinding surface of said second grinding plate;

measuring during refiner operation a second distance from the sensor means in said first grinding plate to the non-wear countersunk surface area of said second grinding plate.

18. The measurement method of claim 17 further comprising the step of calculating a plate wear value by:

taking an initial difference value as the result of subtracting a current first distance from an initial second distance;

taking a current difference value as the result of subtracting the current difference value from a current second distance; and subtracting the current difference value from the initial difference value.

19. The measurement method of claim 18 further comprising the step of calculating plate gap by:

determining a first calibration value as the distance from said sensor means to the grinding surface of said first grinding plate;

determining a second calibration value as the distance from said non-wear surface area of said second grinding plate to the grinding surface of said second grinding plate;

multiplying said first distance by two;

subtracting said second distance therefrom;

adding said second calibration value to the remainder; and subtracting said first calibration value from the resulting sum.

* * * * *